United States Patent
Carnell et al.

(10) Patent No.: US 9,284,189 B2
(45) Date of Patent: Mar. 15, 2016

(54) OXYGEN REMOVAL

(71) Applicant: Johnson Matthey PLC, London (GB)

(72) Inventors: Peter John Herbert Carnell, Cleveland (GB); Martin Fowles, North Yorkshire (GB); Raymond Anthony Hadden, County Durham (GB); Suzanne Rose Ellis, Berkshire (GB)

(73) Assignee: Johnson Matthey PLC, London (GB)

( * ) Notice: Subject to any disclaimer, the term of this patent is extended or adjusted under 35 U.S.C. 154(b) by 245 days.

(21) Appl. No.: 14/038,149

(22) Filed: Sep. 26, 2013

(65) Prior Publication Data

US 2014/0056773 A1   Feb. 27, 2014

Related U.S. Application Data

(62) Division of application No. 12/305,699, filed as application No. PCT/GB2007/050261 on May 14, 2007, now Pat. No. 8,574,328.

(51) Int. Cl.
*C02F 1/20* (2006.01)
*C01B 21/04* (2006.01)
(Continued)

(52) U.S. Cl.
CPC ............ *C01B 21/04* (2013.01); *B01D 53/8671* (2013.01); *C01B 3/36* (2013.01); *C01B 3/382* (2013.01); *C01B 3/386* (2013.01); *C01B 3/48* (2013.01); *C01B 21/0422* (2013.01); *B01D 2257/104* (2013.01); *C01B 2203/0244* (2013.01); *C01B 2203/0255* (2013.01); *C01B 2203/0283* (2013.01); *C01B 2203/04* (2013.01); *C01B 2203/0405* (2013.01); *C01B 2203/0485* (2013.01); *C01B 2203/107* (2013.01); *C01B 2203/1023* (2013.01); *C01B 2203/1041* (2013.01); *C01B 2203/1047* (2013.01); *C01B 2203/1058* (2013.01); *C01B 2203/1064* (2013.01); *C01B 2203/1076* (2013.01);
(Continued)

(58) Field of Classification Search
CPC .............. C01B 3/36; C01B 3/386; C01B 3/48
See application file for complete search history.

(56) References Cited

U.S. PATENT DOCUMENTS

| | | |
|---|---|---|
| 2,384,065 A | 9/1945 | Balcar |
| 4,017,276 A | 4/1977 | Bloem |

(Continued)

FOREIGN PATENT DOCUMENTS

| | | |
|---|---|---|
| EP | 0 145 262 B1 | 6/1985 |
| EP | 0 234 771 B1 | 10/1991 |

(Continued)

OTHER PUBLICATIONS

P. G. Gray et al., "Advances with HotSpot™ Fuel Processing: Efficient Hydrogen Production for Use with Solid Polymer Fuel Cells," *Platinum Metals Rev.*, 2000, vol. 44, No. 3, pp. 108-111.

*Primary Examiner* — Matthew Merkling
(74) *Attorney, Agent, or Firm* — RatnerPrestia

(57) ABSTRACT

A process for reducing free oxygen in a gaseous nitrogen stream includes the steps of (i) reforming a hydrocarbon to generate a gas mixture containing hydrogen and carbon oxides, (ii) mixing the gas mixture with a nitrogen stream containing free oxygen, and (iii) passing the resulting nitrogen gas mixture over a conversion catalyst that converts at least a portion of the free oxygen present in the nitrogen to steam wherein the hydrocarbon reforming step includes oxidation of a hydrocarbon using an oxygen-containing gas.

14 Claims, 2 Drawing Sheets

(51) Int. Cl.
  *C01B 3/36* (2006.01)
  *C01B 3/48* (2006.01)
  *B01D 53/86* (2006.01)
  *C01B 3/38* (2006.01)
  *C02F 103/02* (2006.01)
  *C02F 103/08* (2006.01)

(52) U.S. Cl.
  CPC ... *C01B2203/1082* (2013.01); *C01B 2203/127* (2013.01); *C01B 2203/1241* (2013.01); *C01B 2210/0045* (2013.01); *C02F 1/20* (2013.01); *C02F 2103/023* (2013.01); *C02F 2103/08* (2013.01)

(56) References Cited

U.S. PATENT DOCUMENTS

| | | | |
|---|---|---|---|
| 4,579,723 | A | 4/1986 | Weltmer et al. |
| 4,930,574 | A | 6/1990 | Jager et al. |
| 5,006,133 | A | 4/1991 | Mandrin et al. |
| 5,446,232 | A | 8/1995 | Chen et al. |
| 5,615,561 | A | 4/1997 | Houshmand et al. |
| 5,728,354 | A | 3/1998 | Domergue et al. |
| 2002/0007595 | A1 | 1/2002 | Maier-Roeltgen et al. |
| 2002/0131907 | A1 | 9/2002 | Iwasaki |
| 2004/0159584 | A1 | 8/2004 | Liu et al. |
| 2005/0227129 | A1* | 10/2005 | Iio .................................. 429/20 |

FOREIGN PATENT DOCUMENTS

| | | |
|---|---|---|
| EP | 0 243 052 B1 | 1/1992 |
| EP | 0 262 947 B1 | 6/1992 |
| EP | 0 516 401 A | 12/1992 |
| EP | 0 480 603 B1 | 4/1995 |
| GB | 844971 | 8/1960 |
| GB | 944207 | 12/1963 |
| GB | 2 127 711 A | 4/1984 |
| JP | 06-323757 | 11/1994 |
| WO | WO-99/48805 A1 | 9/1999 |
| WO | WO-00/66487 A1 | 11/2000 |
| WO | WO-2004/069753 A1 | 8/2004 |

* cited by examiner

OXYGEN REMOVAL

CROSS REFERENCE TO RELATED APPLICATION

This application is a divisional application of U.S. patent application Ser. No. 12/305,699 filed Dec. 19, 2008 which is the U.S. National Phase application of PCT International Application No. PCT/GB2007/050261 filed May 14, 2007, and claims priority to British Application No. 0612092.7 filed Jun. 19, 2006.

FIELD OF INVENTION

This invention relates to a process for removing free oxygen from nitrogen, in particular the removal of oxygen from nitrogen used to strip or remove oxygen from another stream.

BACKGROUND OF INVENTION

GB 2127711 describes a process for degassing water using a recirculating inert gas, such as nitrogen, which is regenerated and purified, in the gaseous state. The water is preferably seawater that is to be used as injection water in underground oil reservoirs to obtain a higher degree of hydrocarbon recovery. After contacting the water with the nitrogen gas, the free oxygen transferred to the nitrogen gas is catalytically reacted to form steam. The catalytic reaction is performed in a conversion vessel filled with dry, granulated catalyst such as Pd or Pt on alumina over which is passed the free oxygen-containing stripper gas and pure (99.9%) hydrogen. The pure hydrogen is provided by a water electrolyzer.

EP 0234771 describes an adaptation of this process using a plurality of treatment stages each including a treatment zone through which are passed in co-current flow the water and inert gas. Whereas pure hydrogen may be used for catalytically converting free oxygen in the inert gas into steam, because heat exchange means may be provided to heat the reductant, other reductants may be used such as methanol or natural gas, in particular methanol.

WO 2004/069753 describes yet another adaptation of this process wherein a free oxygen containing inert stripping gas (nitrogen) is used to combust dispersed hydrocarbons in the so-called "produced water" recovered in the production of oil & gas.

Using hydrocarbons to combust free oxygen in stripping gas requires operation of the catalyst at high temperatures, e.g. >300° C. High temperature operation of the catalyst is undesirable as it shortens catalyst life and consumes large amounts of energy. Furthermore, catalyst poisons such as sulphur compounds are often present in hydrocarbon mixtures, especially those recovered from crude oil or natural gas. Methanol combusts more cleanly but cannot generally be produced locally to the de-gassing operation and so must be stored. Methanol is a toxic and highly flammable liquid and storage, particularly in off-shore operations, poses a number of technical and safety difficulties. Electrolytic production of pure hydrogen remains inefficient and expensive. Furthermore, local storage of hydrogen, e.g. in cylinders again poses a number of technical and safety problems.

Therefore there is a need to provide an efficient process for reducing the free oxygen content of nitrogen stripping gas.

SUMMARY OF THE INVENTION

Accordingly the invention provides a process for reducing free oxygen in a gaseous nitrogen stream, comprising the steps of (i) reforming a hydrocarbon to generate a gas mixture containing hydrogen and carbon oxides,
(ii) mixing the gas mixture with a nitrogen stream containing free oxygen, and
(iii) passing the resulting nitrogen gas mixture over a conversion catalyst that converts at least a portion of the free oxygen present in the nitrogen to steam wherein the hydrocarbon reforming step includes oxidation of a hydrocarbon using an oxygen-containing gas.

BRIEF DESCRIPTION OF THE DRAWINGS

The invention is further illustrated by reference to the drawings in which.

DETAILED DESCRIPTION OF THE INVENTION

Figure 1:
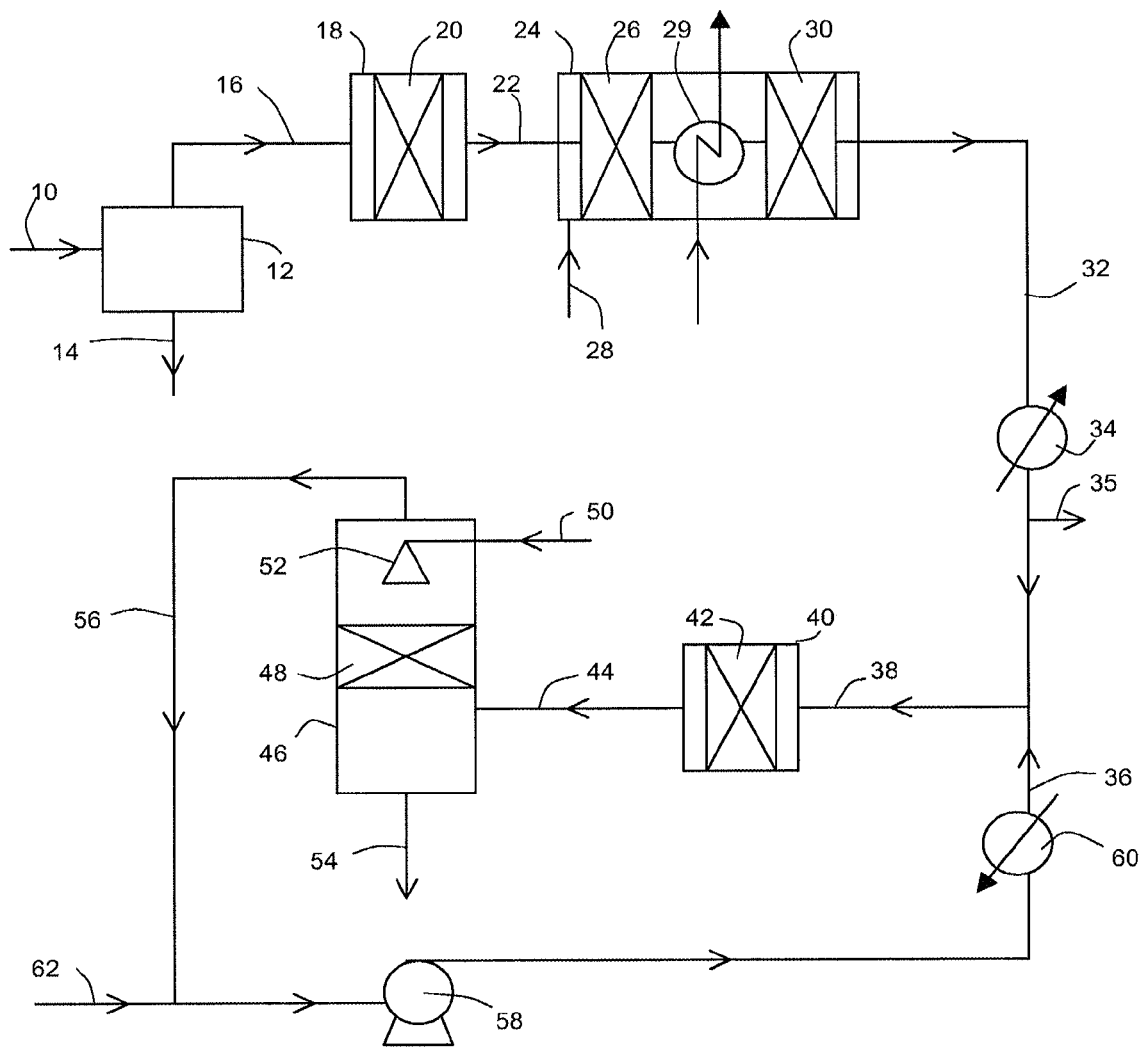
FIG. 1 is a flowsheet of one embodiment of the process of the present invention.

The hydrogen-containing gas mixture may be formed by partial oxidation of the hydrocarbon with an oxygen-containing gas, such as air, oxygen or oxygen-enriched air to produce a gas mixture containing hydrogen and carbon monoxide as well as other gases such as unreacted C2+ hydrocarbons, methane, carbon dioxide and nitrogen. Partial oxidation, may be carried out using any known partial oxidation process. Partial oxidation of a hydrocarbon may be performed by flame combustion in a burner using an oxygen-containing gas in the absence of a combustion catalyst, by so-called non-catalytic partial oxidation (POx), or preferably may be performed at lower temperatures in the presence of a partial oxidation catalyst by so-called catalytic partial oxidation (cPOx). In cPOx, the catalyst is preferably a supported Rh, Ni, Pd, or Pt catalyst having <20% wt metal or alloy combinations of these metals on an inert support such as silica, alumina, titania or zirconia.

Alternatively, the hydrogen-containing gas mixture may be formed by autothermal reforming (ATR) comprising oxidising a portion of the hydrocarbon with an oxygen containing gas in the presence of steam to generate carbon oxides and hydrogen, and steam reforming the resulting gas mixture containing unreacted hydrocarbon over a steam reforming catalyst to produce a gas mixture containing hydrogen and carbon oxides. In autothermal reforming, therefore, steam is added with the hydrocarbon and/or oxygen-containing gas. The oxidation step, which may be performed catalytically, is exothermic and generates the heat required by the endothermic steam reforming reactions. Nickel or precious metal steam reforming catalysts may be used. Precious metal catalysts are preferred. Precious metal catalysts used in reforming the hydrocarbon may include one or more of Pt, Pd, Rh and Ir supported at levels up to 10% wt on oxidic supports such as silica, alumina, titania, zirconia, ceria, magnesia or other suitable refractory oxides, which may be in the form of pellets, extrudates, cellular ceramic and/or metallic monolith (honeycomb) or ceramic foam. In a preferred embodiment, the oxidation and steam reforming reactions are catalysed, more preferably over the same catalyst composition so that one catalyst provides both functions. Such catalysts are described in WO 99/48805 and include Rh or Pt/Rh on a refractory supports comprising Ce and/or Ce/Zr-containing mixtures. The process may be operated at inlet temperatures in the range 250-550° C. and outlet temperatures in the range 600-750° C. depending on the amount of preheat and $O_2$:C:$H_2O$ ratio, and pressures of up to typically about 3 bar abs.

As well as combustion and steam reforming reactions, the water-gas-shift reaction takes place over the reforming catalyst. Thus the reactions taking place in an autothermal reformer, where the hydrocarbon comprises methane are;

$$CH_4 + 2O_2 \rightarrow CO_2 + 2H_2O$$

$$CH_4 + H_2O \rightarrow CO + 3H_2$$

$$CO + H_2O \rightarrow CO_2 + H_2$$

We have found that such oxidation processes deliver a convenient source of hydrogen and provide a hydrogen containing gas with essentially no free-oxygen content, particularly suited to the process of the present invention.

Desirably the POx, cPOX or ATR reforming apparatus is compact. We have found that reforming apparatus designed for fuel cell hydrogen generation is particularly suited to the present invention due to its relatively small size. Suitable apparatus for autothermal reforming is described in EP0262947 and Platinum Met. Rev. 2000, 44 (3), 108-111, and is known as the HotSpot™ reformer.

In a preferred embodiment, the reformed gas mixture containing hydrogen, steam and carbon oxides (CO and $CO_2$) is cooled and passed over a water-gas-shift catalyst that reacts carbon monoxide with steam to increase the hydrogen content of the gas mixture according to the following equation.

$$CO + H_2O \leftrightarrow H_2 + CO_2$$

The water-gas shift catalyst may be precious metal-based, iron-based or copper-based. For example a particulate copper-zinc alumina low-temperature shift catalyst containing 25-35% wt CuO, 30-60% wt ZnO and 5-40% Al2O3% may be used at temperatures in the range 200-250° C. Alternatively the water gas-shift catalyst may be Pt on ceria. Particulate Pt/$TiO_2$ catalysts may also be used.

It is desirable that any heat exchange and water-gas shift apparatus are compact so as to facilitate off-shore as well as on-shore installation.

In particular, the reforming and shift stages may be combined in compact hydrogen-generation apparatus wherein a hydrocarbon and oxygen are combined over a precious metal partial oxidation catalyst, which may also function as a catalyst for the stream reforming reactions, and the resulting reformed gas mixture cooled and passed over a suitable water-gas shift catalyst. Cooling of the reformed gas mixture may be performed using heat exchange means, such as cooling coils or tubes, or by direct injection of water.

In one embodiment the hydrogen generation apparatus comprises a vessel in which is disposed a supported precious metal reforming catalyst and a separate supported water-gas shift catalyst with heat exchange means such as a heat exchange tube or tubes through which a coolant may be passed, disposed between the catalysts. The hydrocarbon is fed with an oxygen-containing gas and steam to the reforming catalyst where oxidation and steam reforming reactions take place. The resulting reformed gas mixture containing hydrogen, carbon oxides steam and a small amount of unreacted hydrocarbon is then cooled by the heat exchange coils and then passed over the water-gas shift catalyst to increase the hydrogen content of the hydrogen-containing gas. The use of hydrogen generation apparatus comprising both reforming and shift catalysts is preferred apparatus in that it is very compact and may therefore readily be installed in off-shore as well as onshore facilities such as oil production platforms.

Whether hydrogen formation is by ATR, POx or cPOx, with or without the water-gas shift reaction, it may be desirable to cool the resulting gas mixture before contacting it with the conversion catalyst. Preferably the temperature of the gas mixture is cooled to ≤100° C., more preferably ≤50° C., before it is contacted with the conversion catalyst. The reformed gas mixture is preferably cooled to below the dew point so that water is condensed from the mixed gases. The water may then be recovered using known separator technology. Cooling of the gas mixture may be effected using known heat exchanger technology. For example the gas mixture may be cooled using water under pressure in high and medium pressure steam generation. Where hydrogen production is by means of autothermal reforming, the steam may conveniently be used in the ATR process. In a preferred embodiment, at least a portion of the condensed water is converted into steam for an ATR process. This reduces the requirement for fresh make-up water, which is advantageous in offshore installations.

The hydrogen-containing gas formed from the hydrocarbon is combined with the nitrogen gas containing free oxygen and the resulting gas mixture passed over the conversion catalyst in order to react the hydrogen with the free oxygen to produce steam. Alternatively or additionally, the conversion catalyst may convert the free oxygen into carbon dioxide by reaction with any carbon monoxide present in the mixed gas stream.

These reactions may proceed according to the following equations;

$$\tfrac{1}{2}O_2 + H_2 \rightarrow H_2O$$

$$\tfrac{1}{2}O_2 + CO \rightarrow CO_2$$

The conversion catalyst is preferably a supported Group 8 transition metal catalyst. For example the catalyst may comprise one or more of Co, Ni, Pt, Pd, Rh, Ir or Ru on an oxidic support such as alumina, titania, zirconia or silica. Stable polymer catalyst supports may also be used. Preferably the catalyst comprises Pt, Pd, Co or Ni on alumina, e.g. ≤5% wt Pd on alumina. The conversion catalyst may be in the form of a woven, nonwoven or knitted mesh, particulate a foam, monolith or coating on an inert support. The conversion of the free oxygen is preferably performed at ≤300° C., more preferably ≤200° C., most preferably ≤150° C., with an inlet gas temperature preferably <100° C., more preferably <50° C.

A portion of the hydrogen-containing gas may if desired be subjected to a step of hydrogen separation e.g. using suitable membrane technology, and the recovered hydrogen sent upstream, e.g. for hydrodesulphurisation purposes.

In a preferred embodiment, the hydrocarbon is natural gas, i.e. a methane-rich gas stream containing minor amounts of C2+ hydrocarbons. The natural gas may be a "raw" natural gas as recovered from subterranean sources, including associated gas recovered with crude oil, or may be a "process" natural gas that has been used in a process, such as a stripping gas. Natural gas liquids (NGLs) may also be used.

If desired, sulphur and or mercury or arsenic absorbers may be provided, e.g. upstream of the hydrogen forming step, to protect any catalysts used therein from poisoning. Suitable sulphur absorbers include zinc oxide compositions, preferably copper-containing zinc oxide compositions whereas mercury and arsenic are usefully absorbed on metal sulphides such as copper sulphide. Particularly suitable sulphur and mercury absorbents are described in EP0243052 and EP0480603. Additionally, hydrodesulphurisation may also be performed upstream of any adsorbents using known Ni or Co catalysts to convert organic-sulphur, -nitrogen -mercury and -arsenic compounds into more readily removable materials such as $H_2S$, $NH_3$, Hg and $AsH_3$.

Although upstream sulphur removal may be desirable to protect the downstream catalysts, in cases where a precious metal reforming catalyst is employed upstream of a copper-based water gas shift catalyst, it may be desirable in addition or as an alternative to include a sulphur absorbent between the reforming catalyst and water-gas shift catalyst.

In the present invention, the nitrogen containing free oxygen has preferably been used to reduce the content of dissolved oxygen from water. The water may be a fresh-water, brine, seawater, produced water, cooling water or injection water.

Accordingly the invention further provides a process for the reducing the free oxygen content of water comprising the steps
(i) contacting water containing dissolved oxygen with a nitrogen stream to form a free-oxygen containing nitrogen stream and a de-oxygenated water stream, and
(ii) reducing the oxygen content of said free-oxygen containing nitrogen stream by
   a. reforming a hydrocarbon to generate a gas mixture containing hydrogen and carbon oxides,
   b. mixing the gas mixture with a nitrogen stream containing free oxygen, and
   c. passing the resulting nitrogen gas mixture over a conversion catalyst that converts at least a portion of the free oxygen present in the nitrogen to steam
wherein the hydrocarbon reforming step includes the oxidation of a hydrocarbon using an oxygen-containing gas.

Hence nitrogen containing free oxygen is preferably a nitrogen stripper gas, which may be used in processes described in GB 2127711, EP 0234771 or WO 2004/069753.

The water that is contacted with the nitrogen stream may be fresh-water, brine, seawater, produced water, cooling water or injection water. The free-oxygen levels in such waters may be 10 ppm or higher. Using the process of the present invention the free-oxygen levels may be reduced to 20 ppb or lower. In one embodiment, the deoxygenated water stream is used in an enhanced oil recovery process to recover a crude oil.

Preferably the hydrocarbon used as the source of hydrogen is a hydrocarbon recovered as part of a crude oil/natural gas production process. Thus in a preferred process, a stream of hydrocarbon, preferably gaseous hydrocarbon, is separated from oil and gas production, used to form a hydrogen-containing gas mixture by ATR, POx or cPOx and this mixture, optionally following a step of water-gas-shift, combined with the nitrogen gas containing free oxygen. The hydrocarbon may be one containing free oxygen or one that has been contacted with a nitrogen stripper gas and so is depleted in free oxygen. The hydrocarbon is preferably a methane-rich hydrocarbon such as natural gas or associated gas. The volume of hydrocarbon separated from the production stream is preferably only enough to generate sufficient hydrogen and/or carbon monoxide required to reduce the free oxygen content of the nitrogen stripper gas to acceptable levels, e.g. to ≤5 ppm. The amount withdrawn for oxidation is therefore preferably ≤5% by volume of the gaseous hydrocarbon stream.

The apparatus used for the process of the present invention may be conveniently compact, in particular where hydrogen generation apparatus comprising separate reforming and water gas shift catalysts is used. In a particularly preferred embodiment, the process of the present invention comprises hydrogen generation using apparatus with separate reforming and water-gas shift catalysts combined with the so-called MINOX™ processes for de-oxygenation of nitrogen stripper gases.

Thus in one embodiment, oxygen may be removed from nitrogen used in a process wherein two separators fed with a seawater and nitrogen mixture are operated in series with nitrogen mixed with the seawater upstream of each separator and wherein the nitrogen stream fed to the first separator is the separated gas from the second separator. The free-oxygen containing nitrogen stripper gas leaving the first separator is passed to a conversion vessel where the oxygen is reacted with hydrogen and/or carbon monoxide produced in the process of the present invention to generate steam and/or carbon dioxide. The nitrogen mixture, depleted in free oxygen, may then be fed to the second separator as the nitrogen stripper gas. As an alternative to the two-stage separator process, a single compact tower and packing vessel may be used with similar effect.

For closed-loop water circuits, such as cooling water circuits, it is desirable to operate the process until the desired oxygen level is achieved and then to operate the process only when needed, e.g., when make-up water is added or if the water circuit has been opened to the atmosphere for maintenance. Alternatively the process may be operated continuously where "fresh" water containing dissolved oxygen is constantly required, e.g. in enhanced oil recovery operations for injection water or produced water.

The nitrogen used in the process of the present invention is preferably pure nitrogen but some oxygen may be tolerated initially as the conversion catalyst will react hydrogen with this to lower the free oxygen content to acceptable levels. Air may be used as a top up gas as long as sufficient hydrogen is available to satisfy the demand and the operation of the process is controlled to prevent catalyst degradation by the exothermic conversion reaction.

The invention further provides apparatus for reducing the free oxygen content of a nitrogen stream, comprising a conversion vessel having free-oxygen-containing gaseous nitrogen inlet means, a conversion catalyst disposed within said vessel and local to said conversion vessel hydrogen generation apparatus that provide a hydrogen-containing gas operatively connected to said vessel such that the nitrogen is mixed with said hydrogen-containing gas and passed over said catalyst, wherein the hydrogen generation apparatus comprises a reformer vessel that has hydrocarbon inlet means, oxygen-containing gas inlet means and optionally a reforming catalyst disposed within said vessel.

The hydrogen generation apparatus may comprise an autothermal reformer having hydrocarbon and steam inlet means, an oxygen-containing gas inlet means, and a steam reforming catalyst.

Alternatively, the hydrogen formation means comprise a partial combustion vessel, having hydrocarbon and oxygen-containing gas inlet means, and optionally containing a partial oxidation catalyst.

Preferably, a water-gas-shift catalyst is disposed downstream of said reforming catalyst, more preferably downstream of said reforming catalyst and disposed within the reformer vessel, especially with cooling means such as heat exchange tube or tubes between said reforming and water-gas shift catalysts.

Where inlet means are provided to a vessel, it will be understood that suitable product outlet means are also provided.

If desired, suitable heat exchanger means may be provided to cool the gaseous product stream from the hydrogen generation apparatus to prevent decomposition of the conversion catalyst.

Although the nitrogen has been described herein as a stripping gas for water, other uses of the present technology are foreseen outside water stripping, for example, liquid hydrocarbon or alcohol stripping.

In FIG. 1, a gas/oil mixture from oil production is fed via line 10 to separator 12 where a portion of natural gas is separated from the oil which is recovered via line 14. The portion of natural gas is passed from separator 12 via line 16 to purification vessel 18, containing a particulate copper-zinc oxide composition 20 that removes hydrogen sulphide from the gas stream. The desulphurised gas is then preheated by means of a heat exchanger (not shown) and fed via line 22 to hydrogen generation vessel 24 containing a monolithic Rh on Ceria-doped zirconia reforming catalyst 26. Such a catalyst catalyses both the combustion and steam reforming reactions. The desulphurised gas is mixed with oxygen and steam fed to the hydrogen generation vessel 24 via line 28 and the mixture autothermally reformed (oxidised and steam reformed) over the catalyst 26. The reformed gas stream comprising hydrogen, steam and carbon oxides, including carbon monoxide, is cooled by means of heat exchange tubes 29 within the vessel 24 downstream of the reforming catalyst 26. The cooled gases then pass to a bed of low-temperature shift catalyst 30 disposed within same vessel 24 downstream of said heat exchange tubes 29. The cooled gas mixture reacts over the catalyst 30 to increase the hydrogen content of the gas mixture by the water-gas shift reaction. The resulting hydrogen-enriched gas mixture is then passed from the hydrogen generation vessel 24 via line 32 to a heat exchanger 34 where it is cooled. The gas is cooled to below the dew point to condense water, which is recovered via line 35 by means of a separator (not shown) and may be used to generate steam for the autothermal reforming. The cooled gas stream containing hydrogen is then mixed with a free-oxygen containing gas stream fed via line 36 and the nitrogen/hydrogen-containing gas mixture passed via line 38 to a conversion vessel 40 containing a bed of supported precious metal conversion catalyst 42. The oxygen in the nitrogen reacts with the hydrogen in the mixed gas stream over the catalyst 42 to form steam, thereby depleting the nitrogen of free oxygen. The oxygen-depleted nitrogen passes from conversion vessel 40 via line 44 to near the bottom of a stripping tower 46 containing a packing 48. The stripping tower 46 is fed with water containing dissolved oxygen via line 50 near the top of the tower. The water is distributed over the top of the packing 48 by distributor means 52 and the water passes down through the packing 48 under the force of gravity. The oxygen-depleted nitrogen fed via line 44 passes up through the packing counter-current to the descending water and thereby contacts the water thereby depleting the water of dissolved oxygen. The oxygen-depleted water is recovered from the bottom of tower 46 via line 54 and may be used in enhanced oil recovery operations to produce the oil/gas mixture 10. The nitrogen passing up through the packing 48 picks up the dissolved oxygen and the resulting oxygen-containing nitrogen stream is conveyed from tower 46 via line 56 and compressor 58 to optional heat exchanger 60 where it may be heated before being fed via line 36 to be mixed with the cooled hydrogen-containing gas stream from heat exchanger 34. Air fed via line 62 to line 56 between the tower 46 and compressor 58 may be used to top up the nitrogen gas stream.

Figure 2:
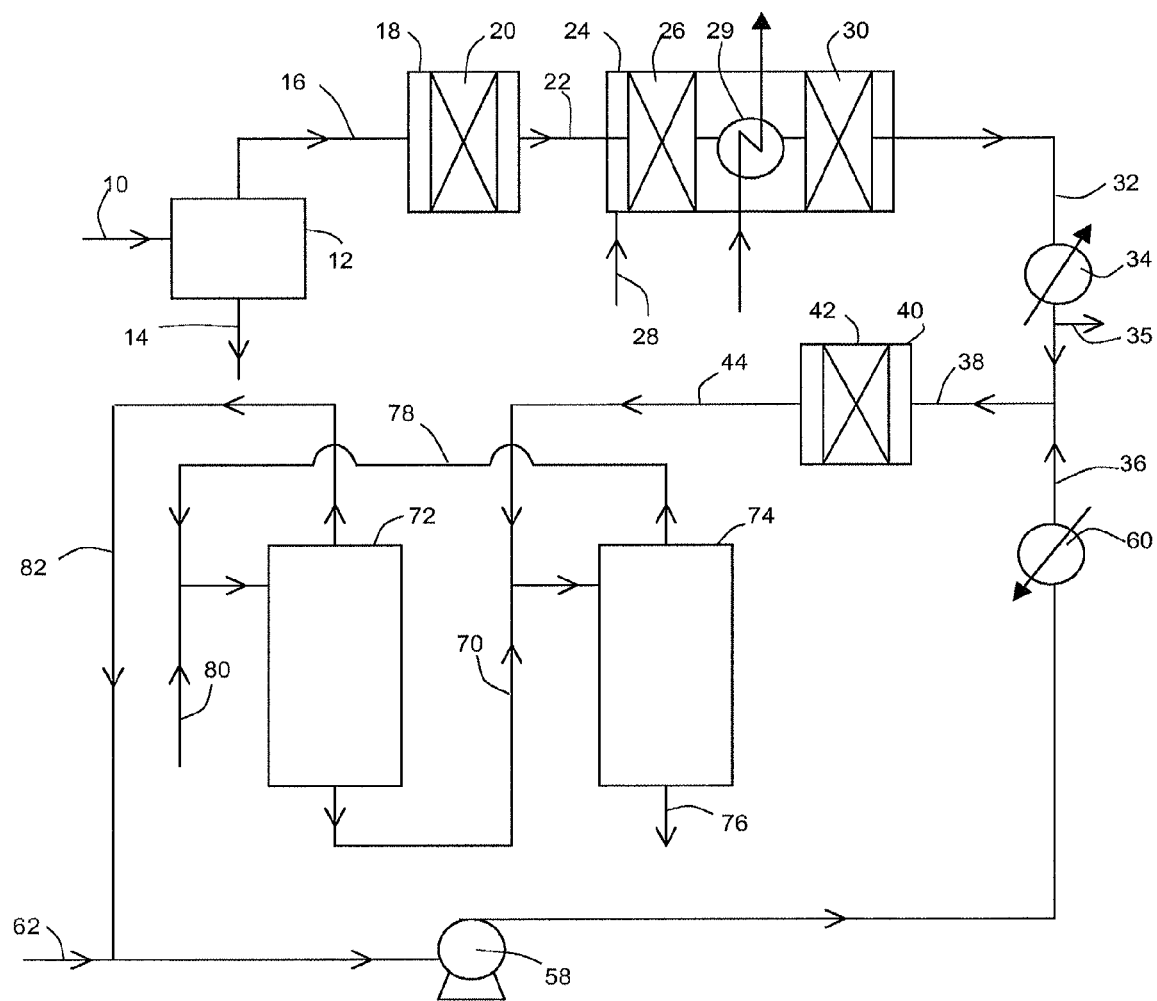
FIG. 2 is a flowsheet of a second embodiment of the process of the present invention.

In FIG. 2, the hydrogen generation and oxygen removal (from $N_2$) stages are identical to those in FIG. 1. In this embodiment, the oxygen-depleted nitrogen passes from conversion vessel 40 via line 44 and is mixed with partially deoxygenated water fed via line 70 from the bottom of a first separator 72. The water/nitrogen mixture is passed to a second separator 74. In the second separator 74 the nitrogen containing free oxygen separates from the de-oxygenated water, which is recovered from the bottom of the separator 74 via line 76. The nitrogen containing free oxygen is recovered from the top of the second separator 74 via line 78, mixed with water containing dissolved oxygen fed via line 80 and the mixture fed to the first separator 72. The nitrogen containing free oxygen recovered from the top of the first separator 72 is conveyed via line 82 and compressor 58 to optional heat exchanger 60 where it may be heated before being fed via line 36 to be mixed with the cooled hydrogen-containing gas stream from heat exchanger 34. Air fed via line 62 to line 82 between the separator 72 and compressor 58 may be used to top up the nitrogen gas stream.

Using the process, the oxygen content of seawater may be reduced from about 9 ppm to less than 20 ppb.

What is claimed:

1. A system for reducing the free oxygen content of a nitrogen stream, the system comprising:
    a reformer vessel having a hydrocarbon inlet and configured to generate a hydrogens containing gas;
    a conversion vessel operatively connected to the reformer vessel, the conversion vessel having at least one gas inlet, a product gas outlet, and a conversion catalyst disposed within the conversion vessel, the at least one gas inlet configured to receive at least one of the hydrogen-containing gas and free-oxygen containing gaseous nitrogen, the conversion vessel configured to allow contact between the hydrogen-containing gas and the conversion catalyst and generate oxygen-depleted nitrogen;
    a source of water containing dissolved oxygen; and
    a contacting unit operatively connected to the conversion vessel and the source of water containing dissolved oxygen, the contacting unit configured to allow contact between the water containing dissolved oxygen and the oxygen-depleted nitrogen to generate a free oxygen-containing stream and a de-oxygenated water stream.

2. The system of claim 1, wherein the reformer vessel contains a reforming catalyst.

3. The system of claim 2, wherein the reformer vessel includes a water-gas-shift catalyst disposed downstream of the reforming catalyst.

4. The system of claim 3, wherein the reformer vessel includes a heat exchanger provided between the reforming catalyst and the shift catalyst and the heat exchanger is configured to cool reformed gas effluent from the reforming catalyst.

5. The system of claim 1, wherein the reformer vessel is an autothermal reformer that contains a reforming catalyst.

6. The system of claim 1, wherein the reformer vessel is a partial combustion vessel that contains a partial oxidation catalyst.

7. The system of claim 1, wherein the water containing dissolved oxygen is at least one of fresh-water, brine, seawater, produced water, cooling water, and injection water.

8. The system of claim 1, wherein the free-oxygen level in the water containing dissolved oxygen is 10 ppm or higher.

9. The system of claim 1, wherein the free-oxygen level in the oxygen-depleted nitrogen is 20 ppb or lower.

10. The system of claim 1, wherein the contacting unit is a first contacting unit and the system further comprises a second contacting unit arranged in series with the first contacting unit,
    wherein the oxygen depleted nitrogen is combined with the water containing dissolved oxygen upstream of each contacting unit and the oxygen depleted nitrogen fed to the second contacting unit comprises the free-oxygen containing stream from the first contacting unit.

11. The system of claim 10, wherein the second contacting unit is operatively connected to the conversion vessel, such that the conversion vessel receives the free-oxygen containing stream leaving the second contacting unit, and the free-oxygen containing stream is combined with carbon monoxide and the hydrogen containing gas in the conversion vessel to generate at least one of steam and carbon dioxide.

12. The system of claim 10, wherein the oxygen depleted nitrogen fed to the first contacting unit is a nitrogen stripper gas.

13. The system of claim 1, wherein the contacting unit comprises a single compact tower and packing vessel.

14. The system of claim 1, wherein the oxygen-depleted nitrogen is pure nitrogen.

* * * * *